US012521956B2

(12) United States Patent
Lucy et al.

(10) Patent No.: US 12,521,956 B2
(45) Date of Patent: Jan. 13, 2026

(54) END FLAP ENGAGEMENT ASSEMBLY FOR ERECTING CARTONS AND RELATED SYSTEMS AND METHODS

(71) Applicant: Graphic Packaging International, LLC, Atlanta, GA (US)

(72) Inventors: Kyle Lucy, Atlanta, GA (US); Nicholas Evans, Canton, GA (US)

(73) Assignee: Graphic Packaging International, LLC, Atlanta, GA (US)

( * ) Notice: Subject to any disclaimer, the term of this patent is extended or adjusted under 35 U.S.C. 154(b) by 86 days.

(21) Appl. No.: 18/533,409

(22) Filed: Dec. 8, 2023

(65) Prior Publication Data

US 2024/0190100 A1 Jun. 13, 2024

Related U.S. Application Data

(60) Provisional application No. 63/431,469, filed on Dec. 9, 2022.

(51) Int. Cl.
*B31B 50/36* (2017.01)
*B31B 50/04* (2017.01)

(52) U.S. Cl.
CPC .............. *B31B 50/36* (2017.08); *B31B 50/04* (2017.08)

(58) Field of Classification Search
CPC ......... B31B 50/36; B31B 50/04; B31B 50/06; B31B 50/005; B31B 50/0044; B31B 2100/00; B31B 2100/0022
See application file for complete search history.

(56) References Cited

U.S. PATENT DOCUMENTS

| | | | | |
|---|---|---|---|---|
| 3,058,271 | A | 10/1962 | McGihon | |
| 3,376,692 | A * | 4/1968 | Berney | B65B 43/39 53/385.1 |
| 4,164,171 | A | 8/1979 | Meyers et al. | |
| 4,589,862 | A * | 5/1986 | Murrah | B31B 50/00 53/565 |
| 5,241,806 | A | 9/1993 | Ziegler et al. | |

(Continued)

OTHER PUBLICATIONS

Third Party Observation filed in PCT/US2023/083047 dated Jul. 31, 2024.

(Continued)

*Primary Examiner* — Andrew M Tecco
*Assistant Examiner* — Nicholas E Igbokwe
(74) *Attorney, Agent, or Firm* — Andrew N. Claerbout; FisherBroyles, LLC

(57) ABSTRACT

A method of at least partially erecting a carton includes loading a blank in a blank infeed assembly, the blank having a plurality of panels and a plurality of end flaps foldably connected to a respective panel of the plurality of panels. The method further includes positioning the blank on at least one conveyor assembly configured to move the blank in a downstream direction, operating the at least one conveyor assembly to move the blank in the downstream direction toward a carton erection assembly, the carton erection assembly including an end flap engagement assembly positioned adjacent the at least one conveyor assembly, and activating the end flap engagement assembly such that a portion of the end flap engagement assembly contacts and moves at least one end flap of the plurality of end flaps of the blank as the blank moves in the downstream direction.

16 Claims, 10 Drawing Sheets

(56) References Cited

U.S. PATENT DOCUMENTS

| | | | | |
|---|---|---|---|---|
| 5,352,178 | A | 10/1994 | Pazdernik | |
| 5,456,058 | A | 10/1995 | Ziegler | |
| 5,692,361 | A | 12/1997 | Ziegler et al. | |
| 5,706,633 | A | 1/1998 | Moncrief et al. | |
| 6,027,440 | A * | 2/2000 | Roth | B65H 5/228 493/436 |
| 7,316,103 | B2 | 1/2008 | Ford | |
| 7,886,503 | B2 * | 2/2011 | Chase | B65B 7/20 53/376.4 |
| 9,764,904 | B2 | 9/2017 | Barber et al. | |
| 10,071,828 | B2 | 9/2018 | Moncrief et al. | |
| 10,421,572 | B2 | 9/2019 | Moncrief et al. | |
| 11,053,086 | B2 | 7/2021 | Ziegler | |
| 11,691,826 | B2 | 7/2023 | Ziegler | |
| 2009/0093355 | A1 * | 4/2009 | Huang | B65B 43/265 493/309 |
| 2009/0239726 | A1 * | 9/2009 | Huang | B31B 50/787 493/309 |
| 2012/0208686 | A1 * | 8/2012 | Iwasa | B65B 7/20 493/162 |
| 2014/0179501 | A1 * | 6/2014 | Akama | B31B 50/262 493/162 |
| 2018/0126683 | A1 * | 5/2018 | Johnson | B31B 50/046 |
| 2021/0138756 | A1 * | 5/2021 | Langen | B31B 50/262 |
| 2022/0184912 | A1 | 6/2022 | Olmos | |
| 2022/0194043 | A1 | 6/2022 | Schroeder | |

OTHER PUBLICATIONS

Ocme, Altair HT—the fastest wrap around packer in the world, https://www.youtube.com/watch?v=gkK2TuokwR8, published Apr. 22, 2021, retrieved Jul. 31, 2024.

International Search Report and Written Opinion for PCT/US2023/083047 dated Apr. 9, 2024.

* cited by examiner

END FLAP ENGAGEMENT ASSEMBLY FOR ERECTING CARTONS AND RELATED SYSTEMS AND METHODS

CROSS-REFERENCE TO RELATED APPLICATION

The present application claims the benefit of U.S. Provisional Patent Application No. 63/431,469, filed on Dec. 9, 2022.

INCORPORATION BY REFERENCE

The entire disclosure of U.S. Provisional Patent Application No. 63/431,469, filed on Dec. 9, 2022, is hereby incorporated by reference for all purposes as if set forth in its entirety.

BACKGROUND OF THE DISCLOSURE

The present disclosure generally relates to systems and methods for forming cartons. More specifically, the present disclosure is directed to systems for forming cartons and related methods that include at least one end flap engagement assembly for engaging one or more end flaps of a carton in the course of erecting the carton.

SUMMARY OF THE DISCLOSURE

According to one aspect, a method of at least partially erecting a carton comprises loading a blank in a blank infeed assembly, the blank comprising a plurality of panels and a plurality of end flaps foldably connected to a respective panel of the plurality of panels, positioning the blank on at least one conveyor assembly configured to move the blank in a downstream direction, operating the at least one conveyor assembly to move the blank in the downstream direction toward a carton erection assembly, the carton erection assembly comprising an end flap engagement assembly positioned adjacent the at least one conveyor assembly, and activating the end flap engagement assembly such that a portion of the end flap engagement assembly contacts and moves at least one end flap of the plurality of end flaps of the blank as the blank moves in the downstream direction.

According to another aspect, the disclosure is generally directed to a carton forming system, the carton forming system comprising a blank infeed assembly proximate an upstream end of the carton forming system for receiving at least one blank comprising a plurality of panels and a plurality of end flaps foldably connected to a respective panel of the plurality of panels, at least one conveyor assembly positioned downstream from the blank infeed assembly in a machine direction of the carton forming system, the at least one conveyor assembly comprising at least one conveyor member defining a rail for at least partially supporting the at least one blank, the at least one conveyor assembly comprising a plurality of engagement lugs movable along the rail for at least partially moving the at least one blank in the machine direction, and at least one end flap engagement assembly positioned adjacent the at least one conveyor assembly, the end flap engagement assembly comprising a driving apparatus, a connecting member operably coupled to the driving apparatus, and a crank apparatus operably coupled to the connecting member and supporting an end flap engagement member for contacting at least one end flap of the plurality of end flaps of the blank.

According to another aspect, the disclosure is generally directed to an end flap engagement assembly for a carton forming system, the end flap engagement assembly comprising a driving apparatus, a connecting member operably coupled to the driving apparatus, and a crank apparatus operably coupled to the connecting member and supporting an end flap engagement member for contacting at least one end flap of a blank.

Those skilled in the art will appreciate the above stated advantages and other advantages and benefits of various additional embodiments reading the following detailed description of the embodiments with reference to the below-listed drawing figures. It is within the scope of the present disclosure that the above-discussed aspects be provided both individually and in various combinations.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION OF THE EXEMPLARY EMBODIMENTS

The present disclosure generally relates to systems including end flap engagement assemblies for forming cartons or other containers, trays, or other constructs for holding articles such as beverage containers. Such beverage containers can be made from materials suitable in composition for packaging the particular food or beverage item, and the materials include, but are not limited to, aluminum and/or other metals; glass; plastics such as PET, LDPE, LLDPE, HDPE, PP, PS, PVC, EVOH, and Nylon; and the like, or any combination thereof.

Cartons according to the present disclosure can accommodate articles of any shape. For the purpose of illustration and not for the purpose of limiting the scope of the disclosure, the following detailed description describes beverage containers (e.g., glass beverage bottles) as disposed within the carton embodiments. In this specification, the terms "inner," "interior," "outer," "exterior," "lower," "bottom," "upper," and "top" indicate orientations determined in relation to fully erected and upright cartons.

Figure 1:
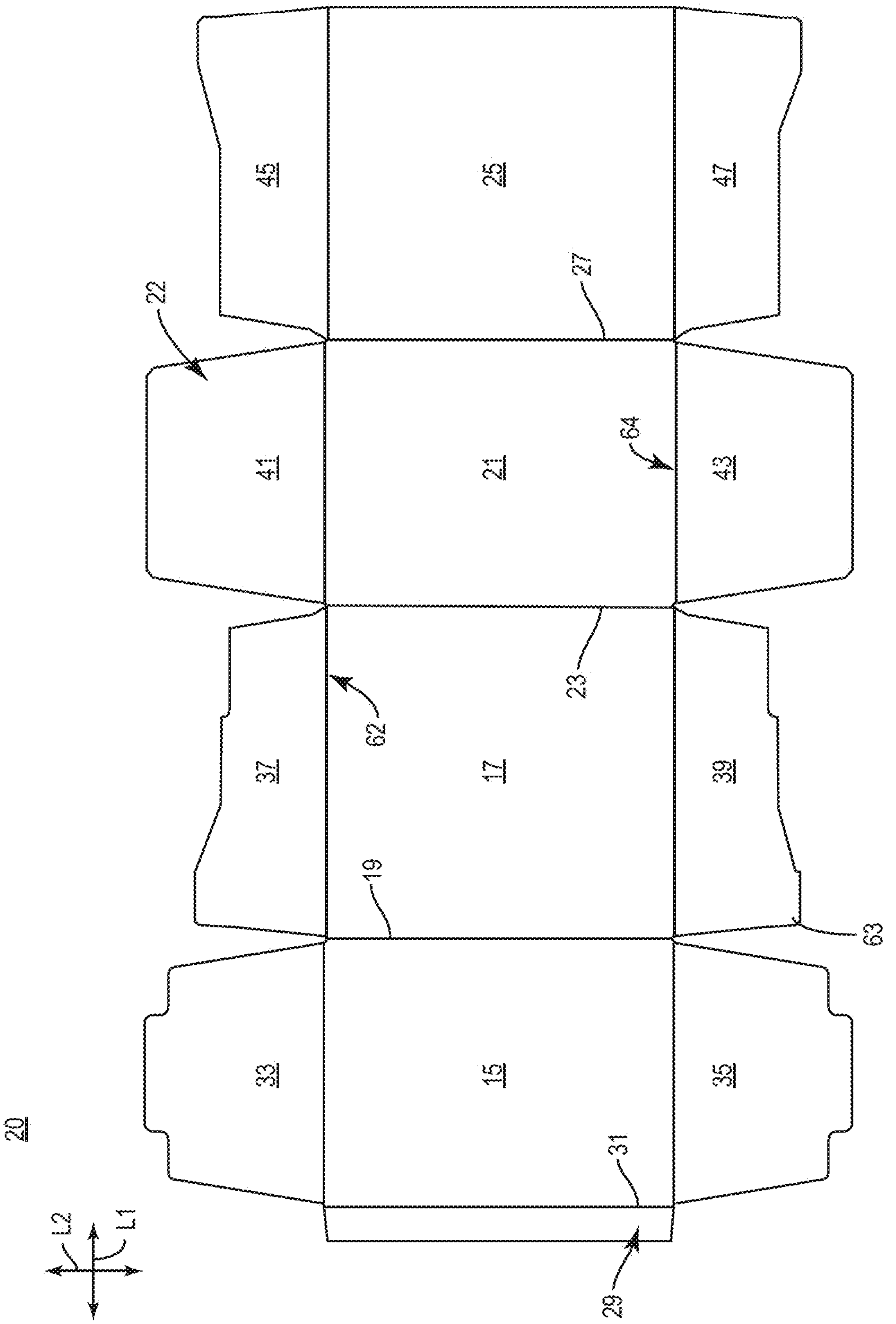
FIG. 1 is a plan view of a blank for forming a carton according to an exemplary embodiment of the disclosure.
Figure 2:
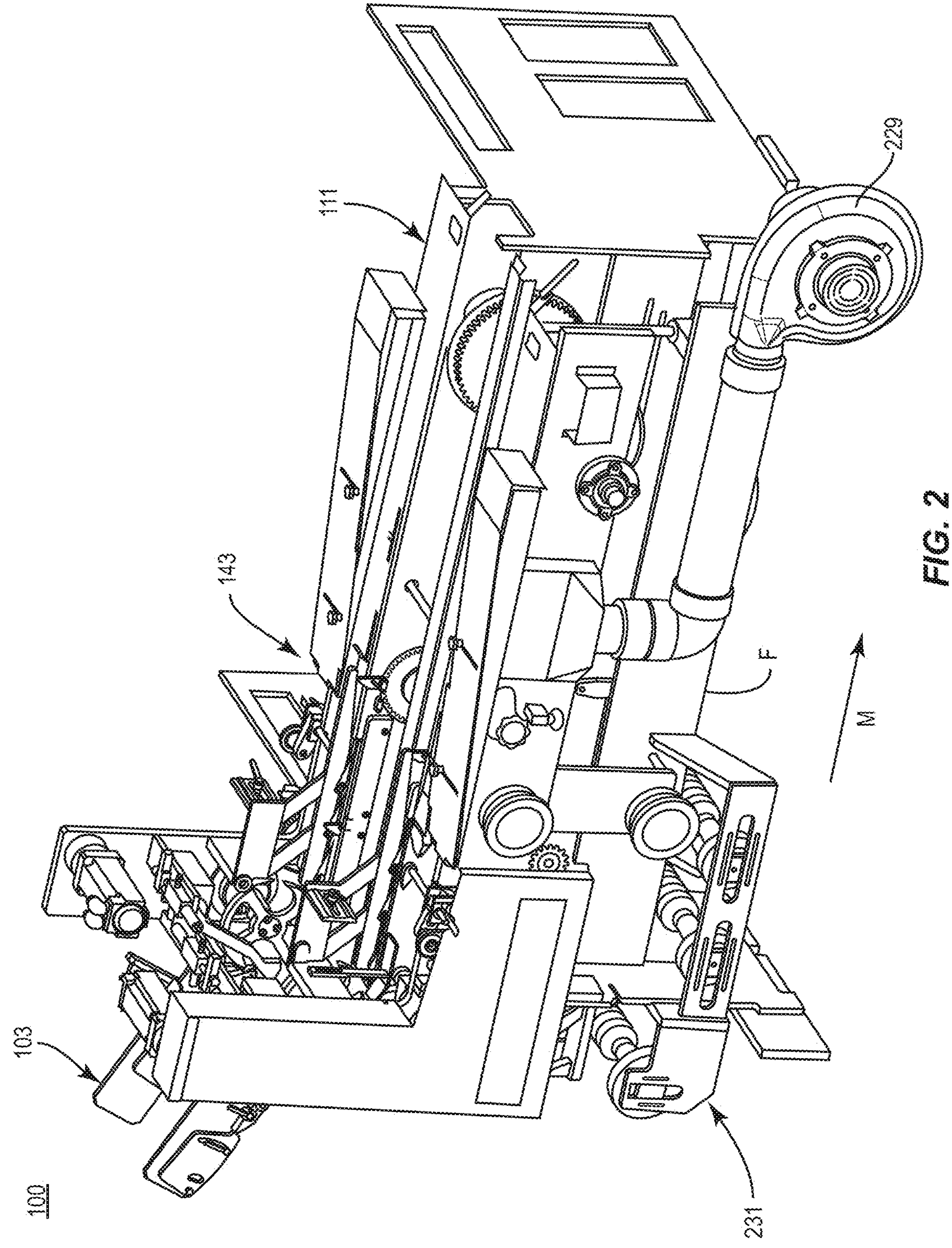
FIG. 2 is a perspective view of a system for at least partially forming a carton according to an exemplary embodiment of the disclosure.
Figure 5:
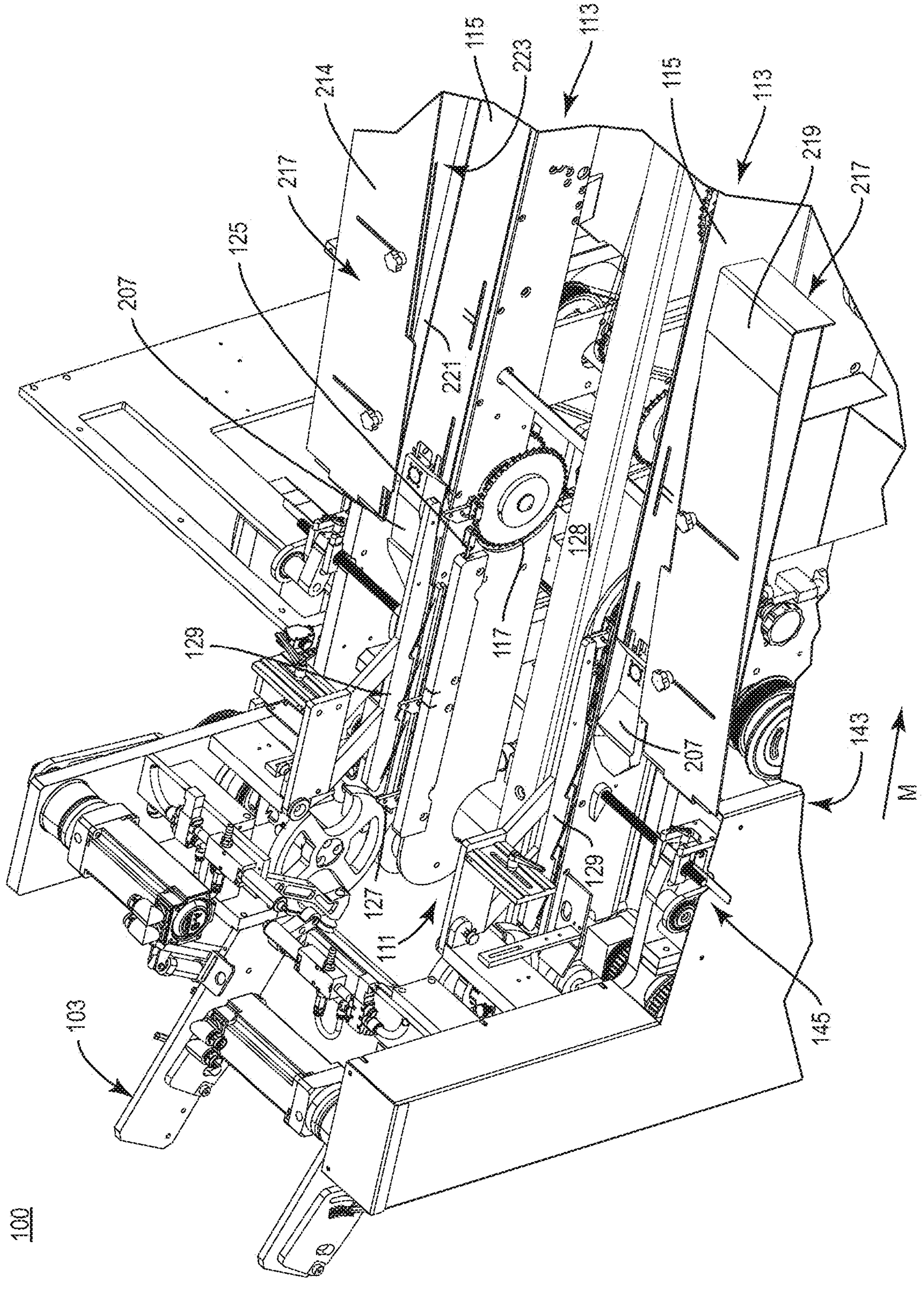
FIG. 5 is an enlarged perspective view of a conveyor assembly and end flap engagement assembly of the system of FIG. 2.

FIG. 2 generally illustrates an example embodiment of a method and system 100 for at least partially forming cartons from blanks 20 (FIG. 1). In the illustrated embodiment, the system 100 engages one or more cartons formed from an at least partially folded configuration of the blanks 20, and includes at least one end flap engagement assembly 145 (FIG. 5) for engaging one or more end flaps of the blank 20 in the course of at least partially forming, e.g., erecting or otherwise reconfiguring, a carton.

Referring momentarily to FIG. 1, a plan view of the exterior side 22 of a blank, generally indicated at 20, suitable for use with the system 100 to form a carton according to various exemplary embodiments of the disclosure is illustrated. The resulting carton be used to house a plurality of articles such as containers, e.g., metal fluid-filled containers such as aluminum cans, or plastic/glass/composite fluid-filled containers such as bottles, and the carton formed from the blank 20 can be sized to house in various row-by-column and/or tiered arrangements as desired.

The carton blank 20 can have a longitudinal axis L1 and a lateral axis L2. In the illustrated embodiment, the blank 20 and carton formed therefrom can include a plurality of panels that can include a top panel 15 foldably connected to a first side panel 17 at a first lateral fold line 19. A bottom panel 21 can be foldably connected to the first side panel 17 at a second lateral fold line 23. A second side panel 25 can be foldably connected to the bottom panel 21 at a third lateral fold line 27. In the illustrated embodiment, the blank 20 includes an attachment flap 29 foldably connected to the top panel 15 at a fourth lateral fold line 31. Any of the top and bottom panels 15, 21, the first and second side panels 17, 25, and the attachment flap 29 can be otherwise shaped, arranged, configured, or omitted, without departing from the disclosure.

The blank 20 and carton formed therefrom can also include a plurality of end flaps foldably connected to a respective panel of the plurality of panels. In the illustrated embodiment, the top panel 15 can be foldably connected to a first top end flap 33 and a second top end flap 35. The first side panel 17 can be foldably connected to a first side end flap 37 and a second side end flap 39. The bottom panel 21 can be foldably connected to a first bottom end flap 41 and a second bottom end flap 43. The second side panel 25 can be foldably connected to a first side end flap 45 and a second side end flap 47. When the carton is erected, the top and bottom end flaps 33 and 41 and side end flaps 37 and 45 can close a first end of the carton, and the top and bottom end flaps 35 and 43 and side end flaps 39 and 47 can close a second end of the carton. In accordance with an alternative embodiment of the present disclosure, different flap arrangements can be used for at least partially closing the ends of the carton.

In one embodiment, the top and bottom end flaps 33, 41 and side end flaps 37, 45 extend along a first marginal area of the blank 20, and are foldably connected to the respective panels 15, 21, 17, 25 at respective portions of a first longitudinal fold line 62 that extends along the length of the blank 20. In the illustrated embodiment, the top and bottom end flaps 35, 43 and side end flaps 39, 47 extend along a second marginal area of the blank 20, and are foldably connected to the respective panels 15, 21, 17, 25 at respective portions of a second longitudinal fold line 64 that also extends along the length of the blank 20. The longitudinal fold lines 62, 64 may be, for example, substantially straight, or offset at one or more locations to account for blank thickness or for other factors.

It will be understood that the blank 20 and the carton formed therefrom can have a different arrangement without departing from the disclosure. The blank 20 and carton formed therefrom can also include one or more additional or alternative features, e.g., handle features, dispenser features, article protection features, etc., to suit a particular application. As described herein, intermediate folded configurations between the blank 20 and the carton formed therefrom may be designated blanks 20.

With additional reference to FIG. 2, the method and system 100 can include a machine frame F supporting the various assemblies and components thereof described herein. The machine frame F can include one or more of bases, legs, struts, tie bars, platforms, etc., in various arrangements, to provide a supporting structure for the assemblies and components described herein. For example, the machine frame F can support such components above a base surface such as a ground or floor, and can provide access at one or more locations for human operators, e.g., to inspect, maintain, and/or otherwise operate the system 100.

Figure 3:
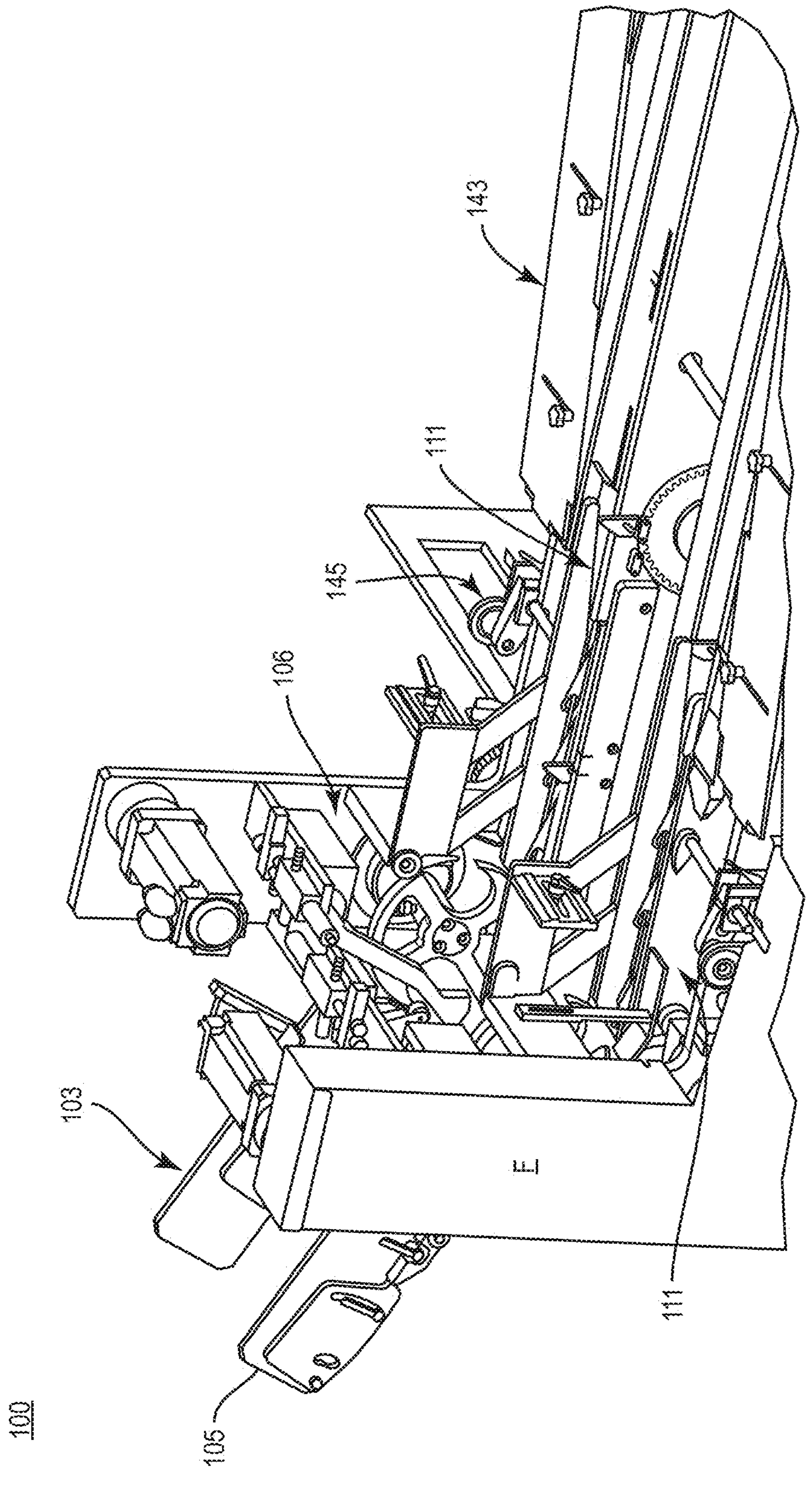
FIG. 3 is an enlarged perspective view of a blank infeed assembly of the system of FIG. 2.
Figure 4:
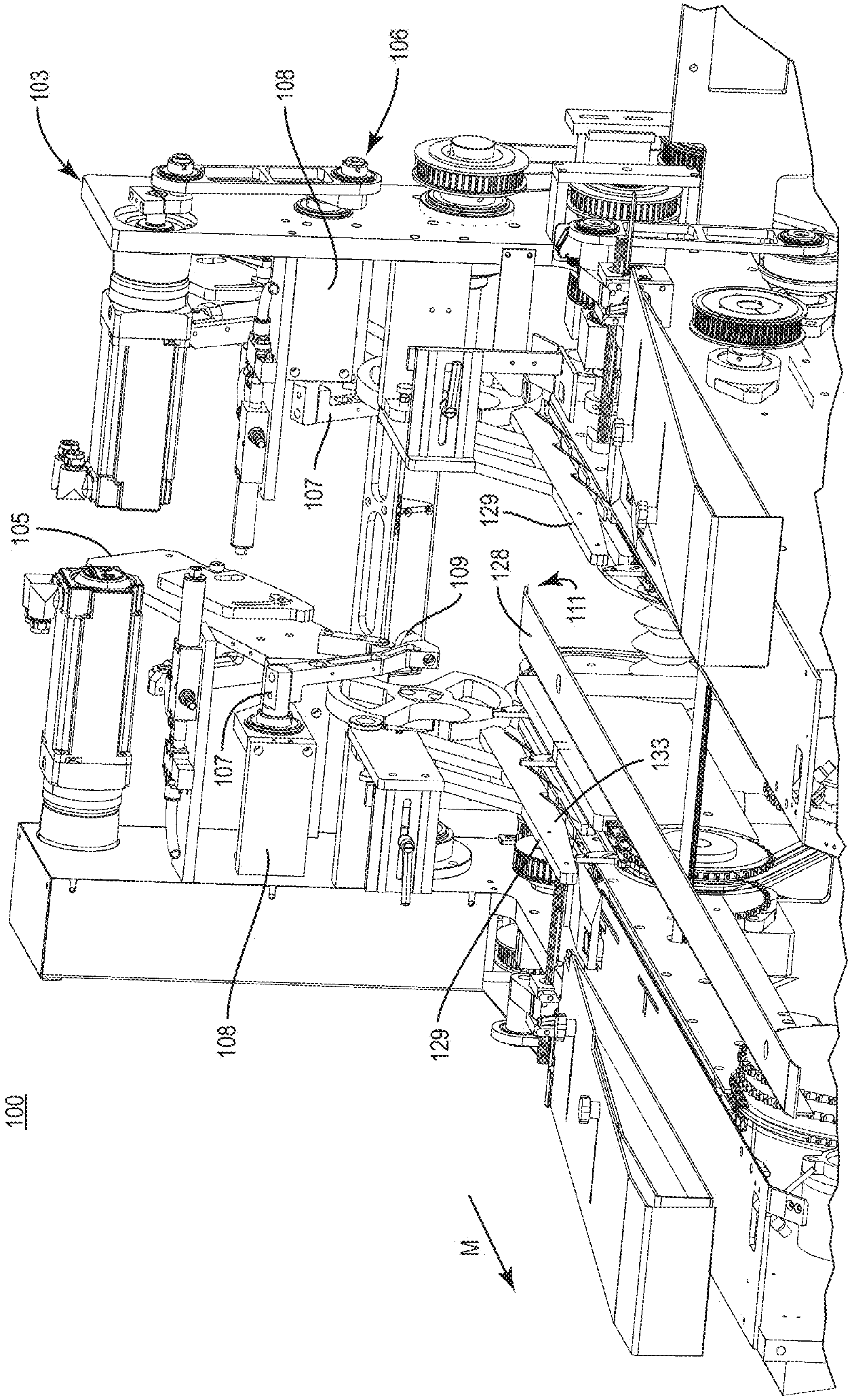
FIG. 4 is another enlarged perspective view of the blank infeed assembly of the system of FIG. 2.
Figure 8:
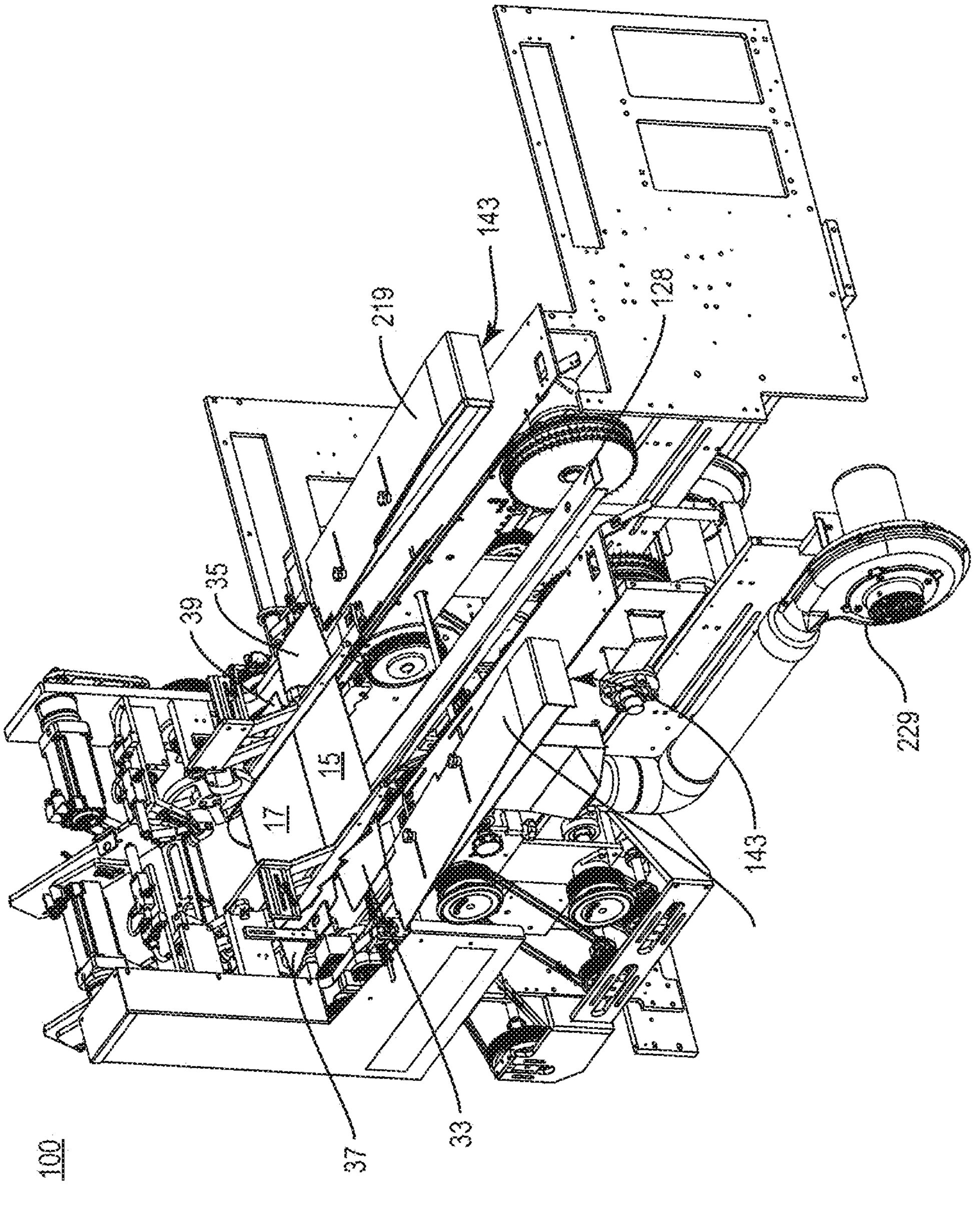
FIGS. 8-9 are sequential perspective views of an operation of the system of FIG. 2.

Referring additionally to FIGS. 3 and 4, the system 100 can include a blank infeed assembly 103 proximate an upstream end of the system 100 and having a magazine 105 defining an interior space for receiving one or more folded or collapsed cartons/blanks 20 (FIG. 8). As shown, the magazine 105 can be shaped and arranged to support multiple cartons/blanks 20 in a horizontally stacked arrangement. It will be understood that the magazine 105 can include one or more features for advancing the cartons/blanks 20 forward through the magazine, e.g., pushers, hoppers, other actuators, etc.

Positioned downstream of the magazine 105, e.g., in a downstream direction or machine direction M along which the cartons/blanks 20 move in the course of operation of the system 100 as described herein, a pick-and-place-style blank feeder apparatus 106, e.g., a pick-and-place style blank feeder, can be provided. In the illustrated embodiment, a pair of carton engagement arms 107 can be pivotably/rotatably mounted on a respective overhead supports 108, e.g., a rod, bar, shaft, mounting block, etc. Each carton engagement arm 107, as shown, can include a respective vacuum cup 109 mounted on a distal end portion thereof. In this regard, in the course of operation of the system 100, the carton engagement arms 107 can be actuated to position the respective vacuum cups 109 to engage a blank 20/carton in the magazine 105 and a vacuum can be applied to the vacuum cups 109 (e.g., via a hose or other fluid line) so that the vacuum cups 109 are configured to acquire the cartons/blanks 20 through a pressure differential such as suction.

Accordingly, and as described further herein, the carton engagement arms 107 can rotate or pivot about/with the overhead support 108 to move a respective blank 20/carton generally in the machine direction M and onto a conveyor assembly 111 downstream from the blank infeed assembly 103. In the illustrated embodiment, a stop member 110 or other limiter can be supported upstream of the carton engagement arms 107 to minimize, inhibit, and/or prevent rearward movement of the carton engagement arms 107 past a preselected position at which the stop member 110 is positioned. It will be understood that, in some embodiments, a portion of the conveyor assembly 111 can extend along the blank infeed assembly 103.

With reference to FIGS. 2-6, the conveyor assembly 111 can include a pair of first conveyor members 113 mounted to the machine frame F in spaced apart and generally parallel relation with respect to the machine direction M. Each conveyor member 113, as shown, includes an upper surface defining a respective rail 115 for supporting the cartons/blanks 20 received from the blank infeed assembly 103. As also shown, one or more sprockets 117 can be rotatably mounted to the respective conveyor members 113, e.g., via a shaft, bearing, spindle, rod, etc. A pair of respective endless belts or chains 125 can be at least partially wrapped about or otherwise positioned in generally curved engagement with the sprockets 117 such that upon rotation of the sprockets 117, as described further herein, the chains 125 move along respective generally closed paths.

As also shown, a series of upstanding carton engagement lugs 127 are coupled at spaced intervals along the length of the respective chains 125 such that, along an upper portion of the closed paths of the chains 125, the lugs 127 protrude upwardly above the respective conveyor members 113. In this regard, the engagement lugs 127 are configured to move in synchronization with the chains 125. As described further herein, as the chains 125 are driven to move about the sprockets 117, the lugs 127 can be carried into engagement with a trailing portion of the respective cartons/blanks 20 to move, e.g., frictionally slide, a lower surface of the blanks/cartons 20 along the rails 115.

In the illustrated embodiment, a central plate 128 can be supported on the machine frame F and positioned between and in generally parallel relation with the rails 115 for at least partially supporting cartons/blanks 20, for example, a central portion of larger cartons/blanks 20. It will be understood that the central plate 128 can be omitted from the system 100 without departing from the disclosure.

A pair of carton braces 129 can be attached to the machine frame F, for example, with struts or other attachment members, and can include one or more spaced apart downward extensions 133 that provide a stop or upper limit of movement for cartons/blanks 20 traveling along the conveyor assembly 111. In this regard, the carton braces 129 can be positioned above the conveyor members 113 to maintain/stabilize a vertical position of the cartons/blanks 20 moving along the system 100.

The conveyor assembly 111 can also include a pair of second conveyor members 135 positioned downstream from the first conveyor members 113, and a second pair of endless belts or chains 125 that are at least partially wrapped or otherwise in generally curved engagement with one or more sprockets rotatably mounted to the conveyor members 135 such that, upon rotation of the sprockets, as described further herein, the chains 125 move along respective second generally closed paths. In the illustrated embodiment, the sprockets can include sprockets 137, 139, 141, as well as the sprocket 121 associated with the first conveyor members 131, though a different arrangement of sprockets or rotatable members could be provided without departing from the disclosure. It will be understood that one or more carton engagement lugs can be coupled to the chains 125 associated with the respective second conveyor members 135 in the manner described above with regard to the first conveyor members 113, e.g., for engaging cartons downstream of the first conveyor members 113.

While the conveyor assembly 111 is illustrated as having a pair of adjacent/overlapping conveyor members and associated chains, it will be understood that the conveyor assembly 111 can be provided in a different arrangement without departing from the disclosure.

A carton erection assembly 143 can be positioned at least partially along the conveyor assembly 111, and can include a pair of parallel and spaced apart end flap engagement assemblies 145 at least partially driven by a portion of a drive assembly 231 (FIG. 2), as described further herein.

Figure 7A:
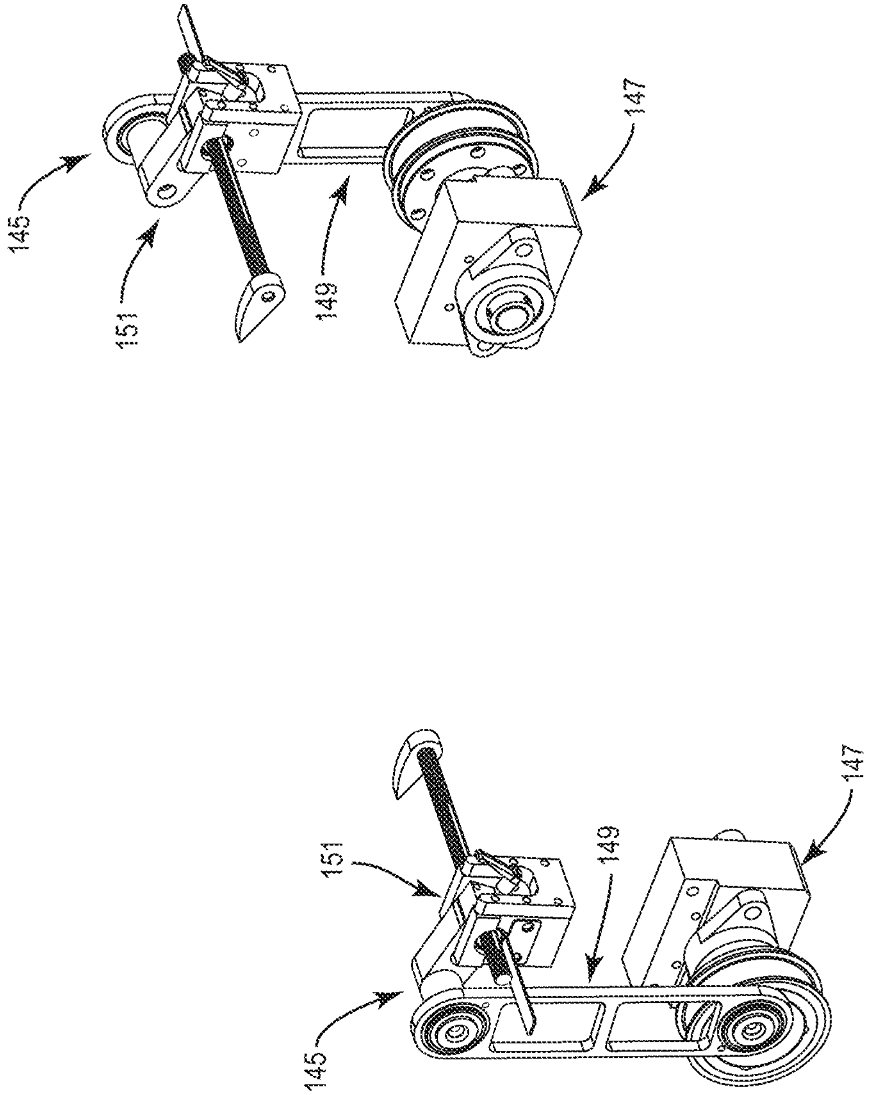
FIG. 7A is a perspective view of a portion of the end flap engagement assembly of the system of FIG. 2.
Figure 7B:
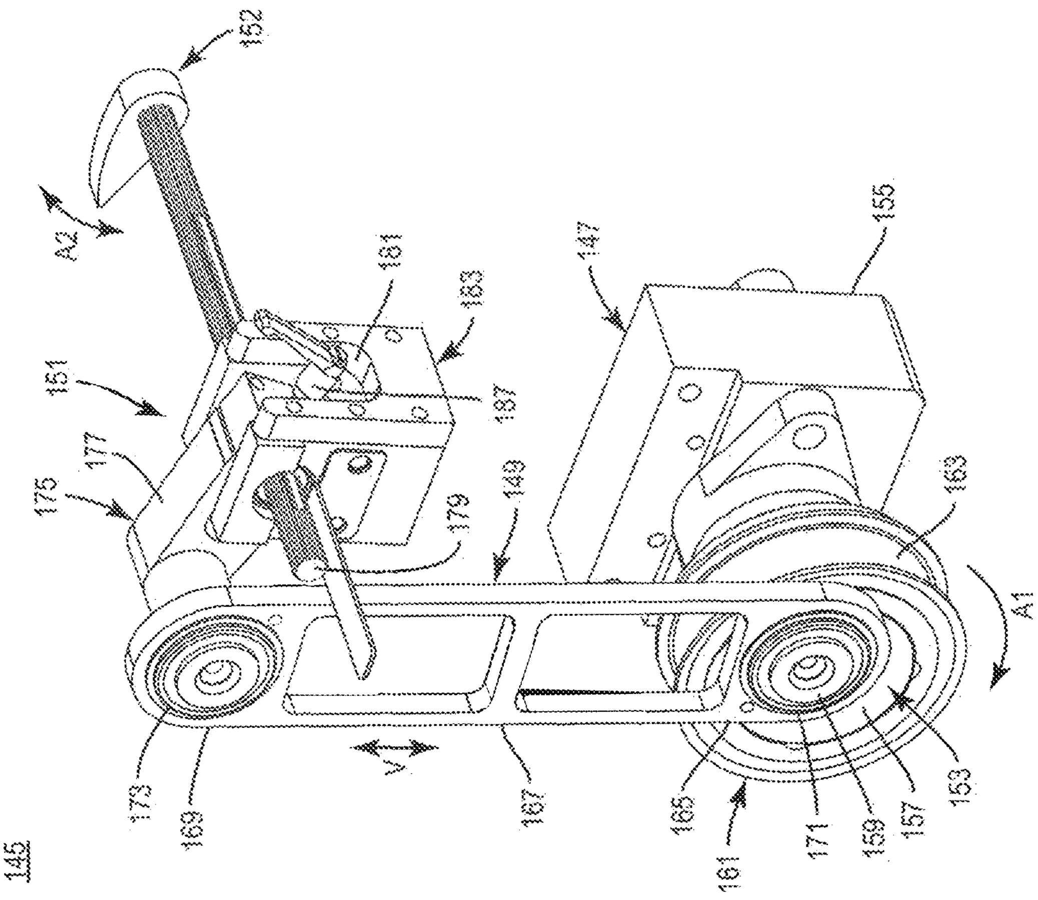
FIG. 7B is another perspective view of a portion of the end flap engagement assembly of the system of FIG. 2.

With additional reference to FIGS. 7A and 7B, each end flap engagement assembly 145 can include a driving apparatus 147, a connecting member 149 extending from the driving apparatus 147 and operably coupled to the driving apparatus 147 so as to be urged into motion thereby, and a crank apparatus 151 operably coupled to the connecting member 149 for facilitating contact of an end flap engagement member 152 with at least one end flap of the cartons/blanks 20.

The driving apparatus 147 can include a rotating member 153 rotatably mounted on a portion of the system 100, for example, via an axle or other structure about which the rotating member 153 is free to rotate or that rotates together with such axle. The rotating member 153 and/or an associated axle can be supported on a mounting block 155 that is attached to the frame F or another portion of the system 100. One or more bushings/bearings or other members for facilitating relative motion of components can be positioned between the mounting block 155 and the rotating member 153.

The rotating member 153, as shown, can include a generally circular, disk-shaped body 157 defining and/or coupled to a projection 159 extending outwardly from the rotating member 153 in a direction generally parallel to an axis of rotation about which the body 157 rotates. As described further herein, the projection 159 is positioned spaced away from an axis of rotation of the body 157 of the rotating member 153.

In the illustrated embodiment, an adapter 161 can at least partially circumscribe a circumferential edge of the body 157 of the rotating member 153, and can define a recessed track 163 at least partially therealong for at least partially receiving a belt or other moving portion of the drive assembly 231. The adapter 161 can be fixedly attached to the body 157 of the rotating member 153, as shown, such that an action of one or more components of the drive assembly 231 to rotate the adapter 161 can cause the rotating member 153 to rotate in kind. In some embodiments, the system 100 can be devoid of the adapter 161 and a recessed track for engaging one or more portions of the drive assembly 231 can be defined along a portion of the body 157 of the rotating member 153.

The connecting member 149, as shown, can include a first end portion 165, a central portion 167 extending from the first end portion 165, and a second end portion 169 extending from the central portion 167.

The first end portion 165 of the connecting member 149, as shown, can have a generally circular or otherwise closed configuration for at least partially receiving or otherwise being coupled to the projection 159 of the rotating member 153. The connecting member 149 can be coupled to the projection 159 and the rotating member 153 via a bushing/bearing 171, as shown, via a clip, clamp or other securing structure, and/or via press or friction fit between the projection and the first end portion 165.

The central portion 167 of the connecting member 149 can have the form of a generally elongate pair of members, and can include one or more crossbars, e.g., for reinforcement, therealong. The central portion 167 of the connecting member 149 can be selectively sized to position the end portions 165, 169 at desired locations along the system 100.

The second end portion 169 of the connecting member 149, as shown, can have a generally circular or otherwise closed configuration for at least partially receiving a portion of the crank apparatus 151 therethrough. The connecting member 149 can be coupled to the crank apparatus 151 via a bushing/bearing 173, as shown, via a clip, clamp or other securing structure, and/or via press or friction fit between the projection and the second end portion 169.

The portion of the crank apparatus 151 that extends at least partially through the second end portion 169 of the connecting member 149 can be that of a pivot arm or crank arm 175. In the illustrated embodiment, the arm 175 can include a body 177 for at least partially receiving an axle 179.

As shown, the body 177 of the crank arm 175 can include an opening through which the axle 179 extends through, and which can be aligned with corresponding openings in a mounting block 183 such that the axle 179 extends through the mounting block 183 and the body 177 of the crank arm 175. In some embodiments the axle 179 can be fixedly coupled to the crank arm 175.

As described herein, the crank arm 175 can be pivotable mounted on the system 100 relative to the mounting block 183 such that a portion of the crank arm 175 is movable through a U-shaped channel 181 defined in the mounting block 183 during operation of the respective end flap engagement assembly 145.

The end flap engagement member 152, as shown, can be coupled proximate a distal end of the axle 179 and can have a generally tapering configuration, e.g., an at least partially curved teardrop shape, as shown, though the end flap engagement member 152 can have a different configuration without departing from the disclosure.

With continued reference to FIGS. 2-7B, each end flap engagement assembly 145 can be positioned upstream of a respective end flap diverting member 207 of the carton erection assembly 143, and as described further herein, is operable to selectively position end flaps of the cartons/blanks 20 relative to the end flap diverting member 207. Each end flap diverting member 207, as shown, has a body with a generally curved or blunted forward nose portion positioned facing the rotational end flap engagement assembly 145 and intersecting a sloped upper surface. The sloped upper surface of the end flap diverting member 207 can include one or more angled, oblique, stepped, etc., surfaces for slidably engaging a portion of the blanks/cartons 20, as described further herein.

Figure 6:
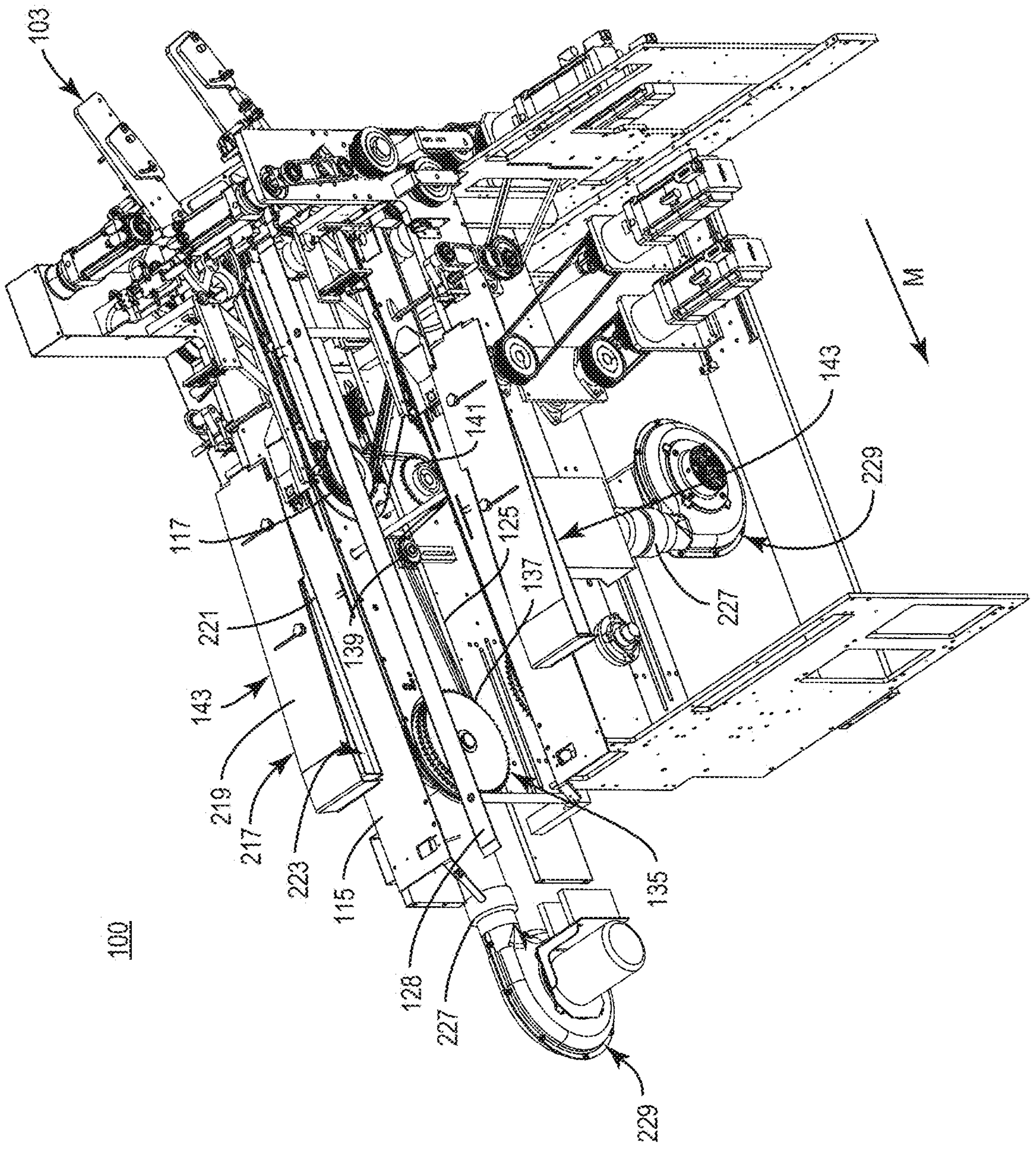
FIG. 6 is another perspective view of the conveyor assembly and end flap engagement assembly of the system of FIG. 2.

Each end flap diverting member 207 can be positioned proximate and below a respective carton formation frame 217 having a sloped upper surface 219 for slidably engaging a portion of the blanks 20, as described further herein. The upper surface 219 of the carton formation frame 217 that slopes upwardly from a generally level lower portion 221 such that an airflow discharge area 223 is defined therebetween. In this regard, an opening can be provided in the lower portion 221 of each carton formation frame 217 and in fluid communication with a respective conduit, e.g., tube, hose, channel, etc. that is fluidly coupled to a respective blower apparatus 229 (FIG. 6).

The blower apparatus 229 can be a fluid driver that is operable to direct moving air through the conduit 227, out the opening 227, and into the airflow discharge area 223 to facilitate erection of the cartons/blanks 20, as described further herein. In this regard, the blower apparatus 229 can be a fan, pump, or other fluid driver driven by, for example, an engine, motor, or other actuator to selectively provide airflow to the airflow discharge area 223.

At least some of the aforementioned components of the system 100 described above can be driven by rotatable shafts, axels, etc., which can be driven to rotate by the drive assembly 231. In the illustrated embodiment, the drive assembly 231 can include a series of interconnecting shafts, gearboxes, and associated couplings, and can be operably coupled to the various assemblies of the system 100 described herein, in one embodiment, by a transmission assembly. In this regard, upon rotation of an input shaft, e.g., by a motor (such as a servo motor), engine, etc., the drive assembly 231 can operate to provide torque and rotational movement to various shafts, axels, gears, pulleys, sprockets, etc., of the transmission assembly to operate the system 100. It will be understood that, in some embodiments, separate motors, engines, actuators (e.g., pneumatic or hydraulic actuators), etc., can be employed to drive one or more components of the system 100.

Figure 9:
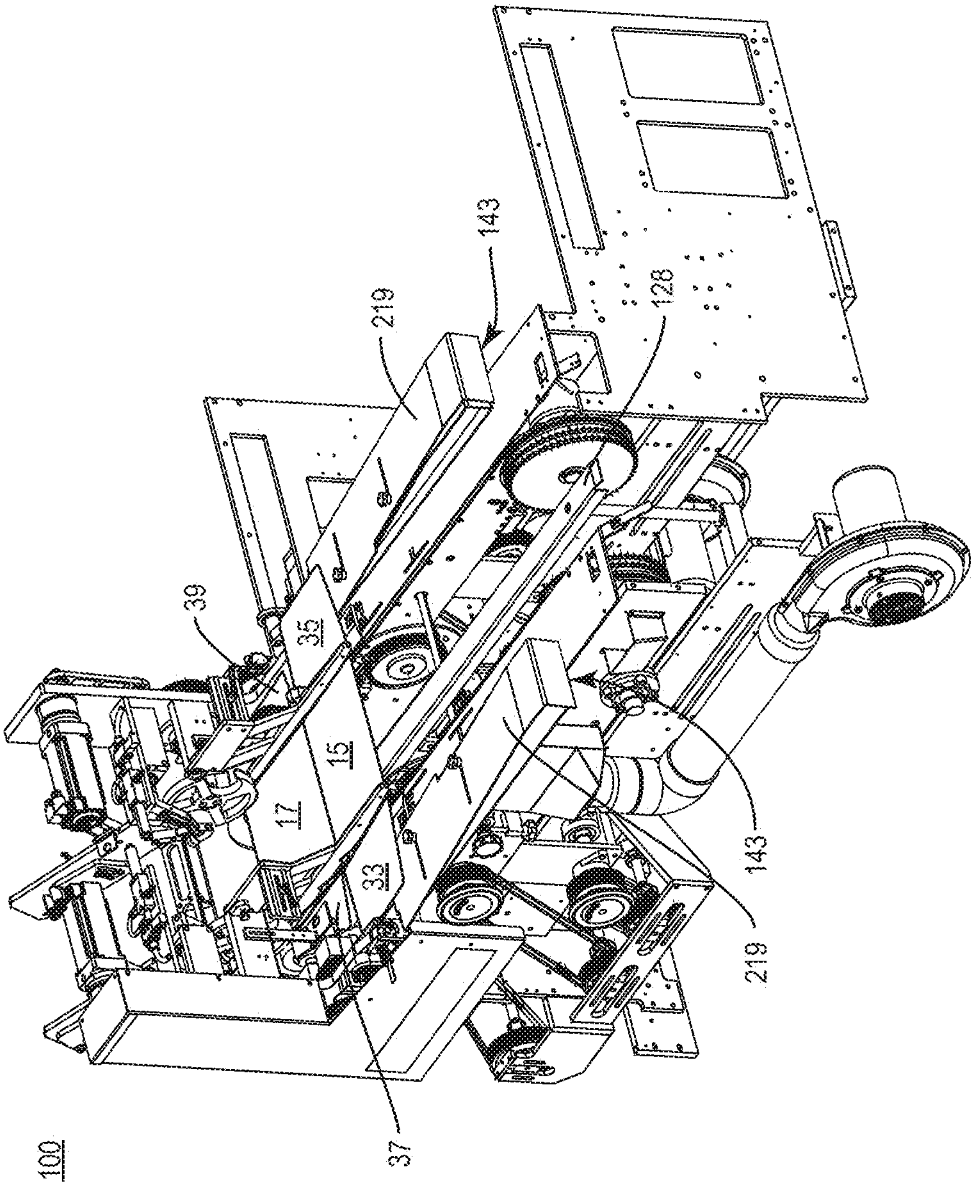

With reference again to FIGS. 2-7B, and with additional reference to FIGS. 8-9, operation of the system 100 to erect cartons/blanks 20, according to one exemplary embodiment of the disclosure, can include loading/receiving at least one carton/blank 20 in the blank infeed assembly 103 and placing a vacuum source in fluid communication with the vacuum cups 109 of the blank feeder apparatus 106 to cause the vacuum cups 109 to engage a forward carton 20 in the magazine 105. It will be understood that such placement of the forward carton 20 can be accomplished by an actuator and/or human operator.

Upon activation of the drive assembly 131, the overhead support 109 of the blank feeder apparatus 106 can be rotated or pivoted to cause the carton engagement arms 107 attached thereto to move at least partially forwardly in the machine direction M, and orient the carton/blank 20 in a generally face up or face down orientation positioned on the conveyor assembly 111. In particular, the folded carton 20 can be provided in a folded configuration supported on respective portions of the rails 115 of the respective conveyor members 113 and the central support plate 128. In such a position the end flaps 33, 35, 37, 39, 41, 43, 45, 47 can be positioned at outermost positions relative to the central support plate 128.

Continued operation of the drive assembly 231 causes the sprockets 117, 119, 121, 123 to rotate and engage the respective chains 125, with upper portions of the chains 125 moving in the machine direction M. One or more of the lugs 127 carried on the respective chains 125 can engage a rear edge of the carton/blank 20 to slidably advance the carton/blank 20 along the rails 115 and central support plate 128.

The drive assembly 231 also causes the end flap engagement assemblies 145 to activate. In particular, one or more belts associated with the drive assembly 231/transmission assembly 239 and positioned in the recessed track 163 of the adapter 161 on the rotating member 153 can cause the rotating member 153 to rotate, for example, in the direction of the arrow A1.

As the rotating member 153 rotates, the projection 159 extending from the body 157 thereof can be carried in an eccentric path, e.g., along a circular path spaced radially outwardly from the geometric center/axis of rotation of the body 157 of the rotating member 153, to carry the first end portion 165 of the connecting member 149 along such eccentric path.

The aforementioned movement of the first end portion 165 of the connecting member 149 is transmitted along the central portion 167 thereof to the second end portion 169, which causes movement of the crank arm 175 at least partially received therethrough.

In the illustrated embodiment, the connecting member 149 is arranged between the driving apparatus 147 and the crank apparatus 151 such that the driven motion of the second end portion 169 of the connecting member 149 generally causes a vertical reciprocating motion of the crank arm 175 about the axel 179 in the direction indicated by the bidirectional arrow V, as shown.

The aforementioned generally upward and downward movement of the crank arm 175 causes the axle 179 and the end flap engagement member 152 coupled thereto along a rotational path generally indicated by the bidirectional arrow A2.

In this regard, activation/driving of the end flap engagement assemblies 145 by respective portions of the drive assembly 231 can cause the respective end flap engagement members 152 to tilt upwardly to engage, e.g., impact, knock, deflect or otherwise move the respective top end flaps 33, 35 (broadly, "first end flap") in an upward direction.

In this regard, as the carton/blank 20 continues in the machine direction M, the top end flaps 33, 35 are deflected upwardly by the respective end flap engagement assemblies 145 to engage the respective end flap diverting members 207 at respective nose portions and/or upper sloped portions to be guided toward the sloped upper surfaces 219 of the respective carton formation frames 217.

Meanwhile, the bottom end flaps 41, 43, are positioned to engage or be supported proximate upper surfaces of the respective second conveyor members 135. As the carton/blank 20 continues to advance in the machine direction M, the sliding engagement of the top end flaps 33, 35 with the upper sloped surfaces 219 of the respective carton formation frames 217 causes the carton 20 to at least partially open, e.g., such that the top panel and the bottom panel increasingly space apart from one another. Such opening/erection of the carton 20 can be facilitated by airflow generated by the respective blower apparatuses 229 and exiting the respective airflow discharge areas 223 toward an interior of the carton/blank 20.

Following the at least partial erection of a carton from a blank 20 described above, the carton can be moved to another system or to a further downstream portion of the system 100, for example, for loading with containers, formations of closed ends of the carton 20, transport, storage, etc.

In view of the foregoing, the end flap engagement assemblies 145 provide a component of the system 100 that facilitates the use of existing drive assemblies/transmission assemblies, e.g., those common to at least one of the blank infeed assembly 103, the conveyor assembly 111, and/or the carton erection assembly 143, e.g., so as to obviate a need for a separate actuator, e.g., pneumatics, hydraulics, etc., to drive the end flap engagement assemblies 145 separately from such other components of the system 100.

In general, the blanks of the present disclosure may be constructed from paperboard having a caliper so that it is heavier and more rigid than ordinary paper. The blank can also be constructed of other materials, such as cardboard, or any other material having properties suitable for enabling the construct to function at least generally as described above. The blank can be coated with, for example, a clay coating. The clay coating may then be printed over with product, advertising, and other information or images. The blanks may then be coated with a varnish to protect information printed on the blanks. The blanks may also be coated with, for example, a moisture barrier layer, on either or both sides of the blanks. The blanks can also be laminated to or coated with one or more sheet-like materials at selected panels or panel sections.

The foregoing description of the disclosure illustrates and describes various embodiments. As various changes could be made in the above construction without departing from the scope of the disclosure, it is intended that all matter contained in the above description or shown in the accompanying drawings shall be interpreted as illustrative and not in a limiting sense. Furthermore, the scope of the present disclosure covers various modifications, combinations, alterations, etc., of the above-described embodiments. Additionally, the disclosure shows and describes only selected embodiments, but various other combinations, modifications, and environments are within the scope of the disclosure as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A method of at least partially erecting a carton, comprising:

- loading a blank in a blank infeed assembly, the blank comprising a plurality of panels and a plurality of end flaps foldably connected to a respective panel of the plurality of panels;
- positioning the blank on at least one conveyor assembly configured to move the blank in a downstream direction;
- operating the at least one conveyor assembly to move the blank in the downstream direction toward a carton erection assembly, the carton erection assembly comprising an end flap engagement assembly positioned adjacent the at least one conveyor assembly;
- activating the end flap engagement assembly such that a portion of the end flap engagement assembly contacts and moves at least one end flap of the plurality of end flaps of the blank as the blank moves in the downstream direction; and
- slidably moving the at least one end flap of the plurality of end flaps of the blank onto a sloped upper surface of at least one carton formation frame of a carton erection assembly positioned downstream from the end flap engagement assembly, wherein the at least one carton formation frame comprises a lower position such that an airflow discharge area is at least partially defined between the lower portion and the upper sloped surface, the airflow discharge area in fluid communication with a blower apparatus for facilitating formation of a carton from the blank.

2. The method of claim 1, wherein a driving apparatus comprises a rotating member comprising a body with a projection extending outwardly from the rotating member, the projection coupled to a connecting member.

3. The method of claim 2, wherein the projection is spaced away from an axis of rotation of the rotating member, and the method comprises rotating the rotating member such that the projection moves along an eccentric path.

4. The method of claim 3, wherein the projection is coupled to a first end portion of the connecting member, and the connecting member further comprises a second end portion coupled to a crank arm of a crank apparatus.

5. The method of claim 4, wherein the crank apparatus comprises the crank arm pivotably mounted to a carton forming system and an axle coupled to the crank arm, an end flap engagement member coupled to the axle.

6. The method of claim 5, wherein the axle is at least partially received through the crank arm and fixedly coupled thereto, and the method comprises moving the crank arm such that the end flap engagement member pivots into engagement with the at least one end flap of the plurality of end flaps of the blank.

7. A carton forming system, the carton forming system comprising:

a blank infeed assembly proximate an upstream end of the carton forming system for receiving at least one blank comprising a plurality of panels and a plurality of end flaps foldably connected to a respective panel of the plurality of panels;

at least one conveyor assembly positioned downstream from the blank infeed assembly in a machine direction of the carton forming system, the at least one conveyor assembly comprising at least one conveyor member defining a rail for at least partially supporting the at least one blank, the at least one conveyor assembly comprising a plurality of engagement lugs movable along the rail for at least partially moving the at least one blank in the machine direction;

at least one end flap engagement assembly positioned adjacent the at least one conveyor assembly, the end flap engagement assembly comprising a driving apparatus, a connecting member operably coupled to the driving apparatus, and a crank apparatus operably coupled to the connecting member and supporting an end flap engagement member for contacting at least one end flap of the plurality of end flaps of the blank; and a carton erection assembly comprising the at least one end flap engagement assembly and at least one carton formation frame positioned downstream from the end flap engagement assembly, the at least one carton formation frame defining a sloped upper surface for slidably receiving the at least one end flap of the plurality of end flaps of the blank, wherein the at least one carton formation frame comprises a lower portion such that an airflow discharge area is at least partially defined between the lower portion and the upper sloped surface, the airflow discharge area in fluid communication with a blower apparatus for facilitating formation of a carton from the blank.

8. The carton forming system of claim 7, wherein the driving apparatus comprises a rotating member comprising a body with a projection extending outwardly from the rotating member, the projection coupled to the connecting member.

9. The carton forming system of claim 8, wherein the projection is spaced away from an axis of rotation of the rotating member such that the projection is configured to move along an eccentric path upon rotation of the rotating member.

10. The carton forming system of claim 9, wherein the projection is coupled to a first end portion of the connecting member, and the connecting member further comprises a second end portion coupled to a crank arm of the crank apparatus.

11. The carton forming system of claim 10, wherein the crank apparatus comprises the crank arm pivotably mounted to the carton forming system and an axle coupled to the crank arm, the end flap engagement member coupled to the axle.

12. The carton forming system of claim 11, wherein the axle is at least partially received through the crank arm and fixedly coupled thereto, such that the end flap engagement member pivots upon movement of the crank arm.

13. An end flap engagement assembly for a carton forming system, the end flap engagement assembly comprising:

a driving apparatus;

a connecting member operably coupled to the driving apparatus; and a crank apparatus operably coupled to the connecting member and supporting an end flap engagement member for contacting at least one end flap of a blank, wherein the driving apparatus comprises a rotating member comprising a body with a projection extending outwardly from the rotating member, the projection coupled to a first end portion of the connecting member, the connecting member further comprising a second end portion coupled to a crank arm of the crank apparatus, the crank arm coupled to an axle that is coupled to the end flap engagement member.

14. The end flap engagement assembly of claim 13, wherein the projection is spaced away from an axis of rotation of the rotating member such that the projection is configured to move along an eccentric path upon rotation of the rotating member.

15. The end flap engagement assembly of claim 14, wherein the crank apparatus comprises the crank arm pivotably mounted to the carton forming system.

16. The end flap engagement assembly of claim 15, wherein the axle is at least partially received through the crank arm and fixedly coupled thereto, such that the end flap engagement member pivots upon movement of the crank arm.

* * * * *